United States Patent [19]
Chiu

[11] Patent Number: 5,836,600
[45] Date of Patent: Nov. 17, 1998

[54] TANDEM BICYCLE WITH DETACHABLE AND FOLDABLE REAR BICYCLE FRAME

[76] Inventor: Ping-Jan Chiu, No. 1146, Chung-Shan Rd., Ta-Chia Chen, Taichung Hsien, Taiwan

[21] Appl. No.: 792,432

[22] Filed: Jan. 30, 1997

[51] Int. Cl.⁶ .................................................. B62K 27/00
[52] U.S. Cl. ........................... 280/231; 280/292; 280/204
[58] Field of Search ..................................... 280/231, 230, 280/288.4, 292, 32.7, 202, 204, 222, 273, 287, 278, 239; 74/551.1, 551.8

[56] References Cited

U.S. PATENT DOCUMENTS

| | | |
|---|---|---|
| 2,517,162 | 8/1950 | Arman . |
| 3,608,917 | 9/1971 | Cogliano . |
| 3,792,875 | 2/1974 | Paden ...................................... 280/203 |
| 4,037,853 | 7/1977 | Sparks ..................................... 280/204 |
| 4,789,206 | 12/1988 | Ozaki . |
| 5,022,672 | 6/1991 | Kawai . |
| 5,067,738 | 11/1991 | O'Connor ................................ 280/204 |
| 5,222,751 | 6/1993 | Chen . |
| 5,339,660 | 8/1994 | Fell . |
| 5,357,643 | 10/1994 | Seals . |
| 5,470,088 | 11/1995 | Adams ..................................... 280/204 |
| 5,716,065 | 2/1998 | Liu .......................................... 280/204 |

FOREIGN PATENT DOCUMENTS

| | | | |
|---|---|---|---|
| 2053546 | 4/1993 | Canada ................................... 280/239 |
| 0008982 | 3/1980 | European Pat. Off. ............... 280/292 |
| 2507145 | 12/1982 | France ................................... 280/292 |

*Primary Examiner*—Brian L. Johnson
*Assistant Examiner*—Gary Savitt
*Attorney, Agent, or Firm*—Sterne, Kessler, Goldstein & Fox P.L.L.C.

[57] ABSTRACT

A separable tandem bicycle includes a front bicycle frame, a rear bicycle frame, and a connecting member which interconnects a front seat tube of the front bicycle frame and a down tube of the rear bicycle frame. The connecting member is detachable from the front seat tube and is foldable over the down tube. A handle bar is detachably mounted to the connecting member. Due to the separable and foldable construction, the tandem bicycle can be put in a package with a reduced size and can be easily stored or transported conveniently.

2 Claims, 4 Drawing Sheets

1

TANDEM BICYCLE WITH DETACHABLE AND FOLDABLE REAR BICYCLE FRAME

BACKGROUND OF THE INVENTION

1. Field of the Invention

This invention relates to a tandem bicycle, more particularly to a separable tandem bicycle with a foldable section between front and rear bicycle frames.

2. Description of the Related Art

Conventional separable tandem bicycles include front and rear bicycle frames which are detachably interconnected by a long connecting portion extending from the rear bicycle frame. Although such separable constructions have facilitated packaging, transportation and storage, they are still found unsatisfactory since the rear frames are long. In storing, the long rear frames tend to tangle with neighboring frames. In packaging, the long frames require large boxes or cartons. A solution to the problems is thus desirable.

SUMMARY OF THE INVENTION

The main object of the present invention is to provide a separable tandem bicycle which has a foldable section in a rear bicycle frame for reduction of the size of packages and for convenient storage.

According to this invention, a separable tandem bicycle includes a front bicycle frame, a rear bicycle frame, and a connecting member which interconnects a front seat tube of the front bicycle frame and a down tube of the rear bicycle frame. The connecting member is detachable from the front seat tube and is foldable over the down tube. A handle bar is detachably mounted to the connecting member. Due to the separable and foldable construction, the tandem bicycle can be put in a package with a reduced size and can be easily stored or transported conveniently.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
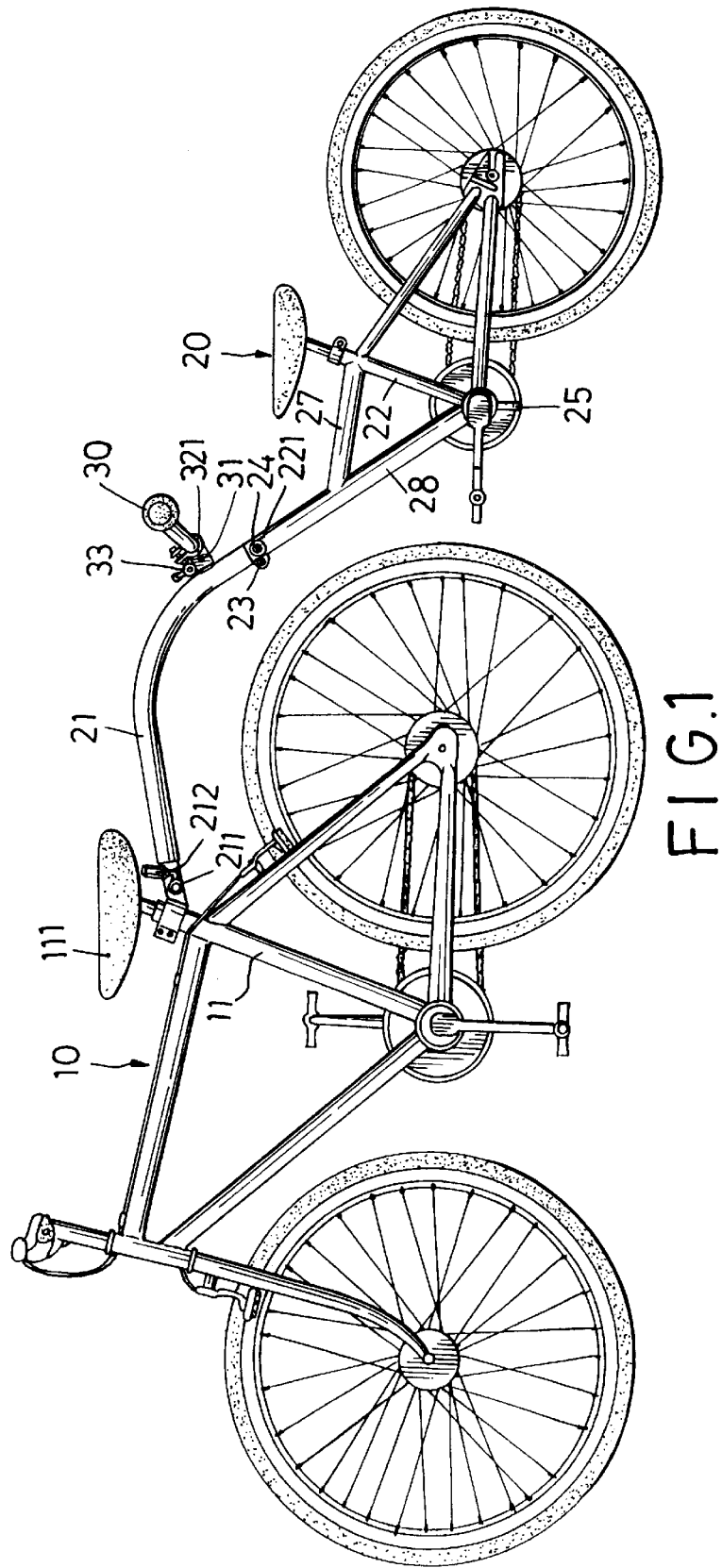
FIG. 1 is a side view of a tandem bicycle of a preferred embodiment according to the present invention.

Referring to FIG. 1, the tandem bicycle according to the present invention is shown to comprise a front bicycle frame 10 and a rear bicycle frame 20. The front bicycle frame 10 has a front seat tube 11 for mounting a seat 111. The rear bicycle frame 20 has a rear sear tube 22, a top tube 27, a down tube 28 which extends upwardly and forwardly from the seat tube 22. A foldable connecting member 21 which interconnects the front seat tube 11 and the down tube 28. The foldable connecting member 21 is detachable from the front seat tube 11 and is foldable over the down tube 28.

Figure 2:
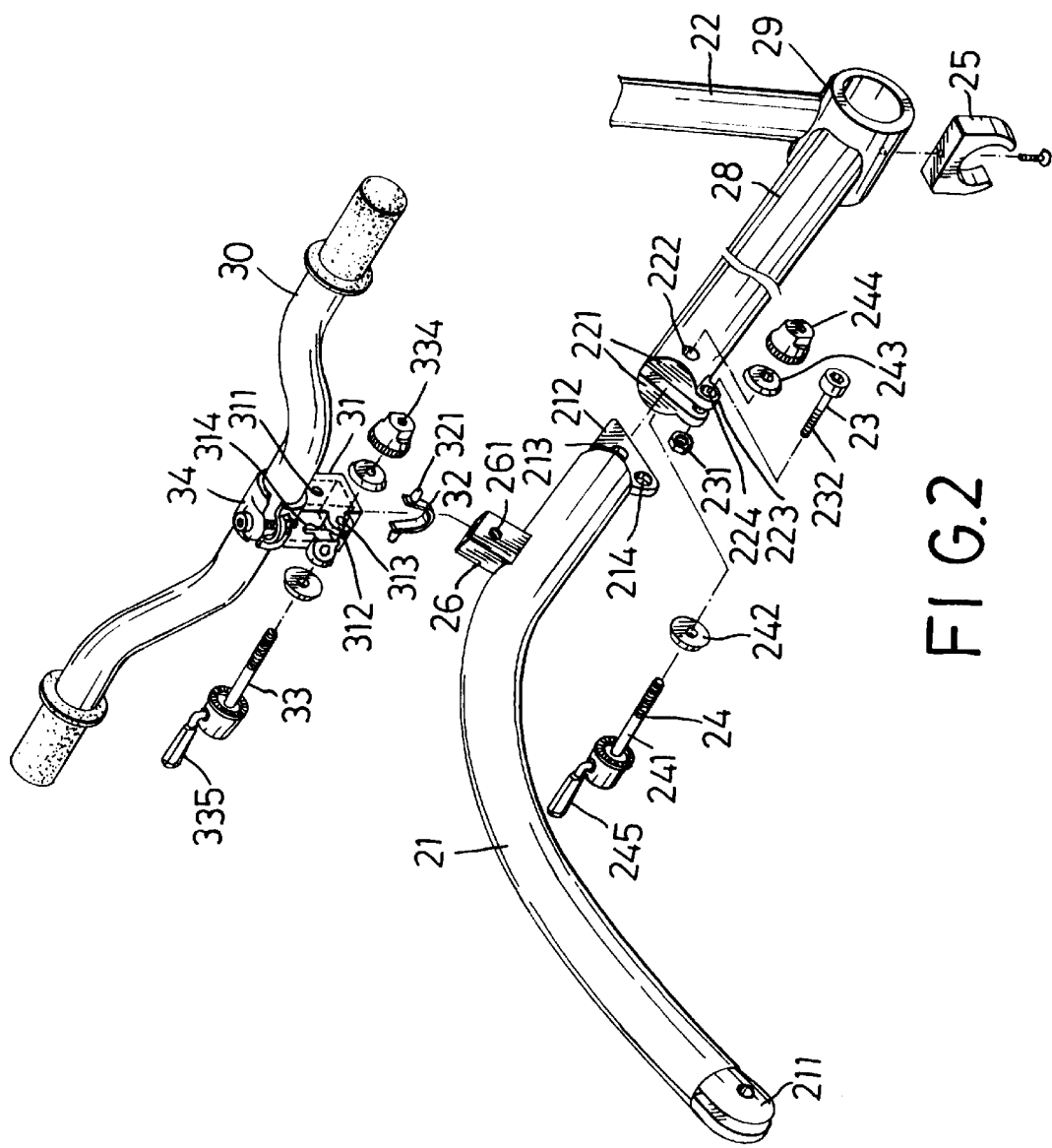
FIG. 2 is an exploded view showing a connection between front and rear bicycle frames according to the present invention.

With reference to FIG. 2, in this embodiment, the top forked end of the down tube 28 is formed into two clamping members 221 and has a pair of lugs 223 which project respectively from the clamping members 221 and which have two respective pivot holes 224, and a through hole 222. The connecting member 21 has an insert plate 212 which can be inserted between the clamping members 221 and between the lugs 223 and which has a through hole 213 and a pivot hole 214 to be aligned with the through hole 222 and the pivot holes 224, respectively. A pivot member 23 passes through the pivot holes 224 and 214 and has a threaded end 232 which is engaged with a nut 231 thereby interconnecting the down tube 28 and the connecting member 21. The connecting member 21 is turnable about the pivot member 23 to be folded over the down tube 28. A first quick release clamp 24 is used to fasten the clamping members 221 and the insert plate 212. The construction of the first quick release clamp 24 is known and includes a bolt 241 which has a headed end and a threaded end. The bolt 241 passes through a pair of washers 242, 243, the through hole 213 and the through hole 222. A nut 244 is threadedly attached to the bolt 241. When an L-shaped operating member 245 is turned in one direction, the clamp 24 is tightened. The clamp 24 can be loosened when the operating member 245 is turned in an opposite direction. At the bottom of the down tube 28, a holding ring 25 is attached to a joint tube 29 to hold a front end 211 of the connecting member 21 after the front end 211 is detached from the front seat tube 11 and the connecting member 21 is folded over the down tube 28.

Figure 3:
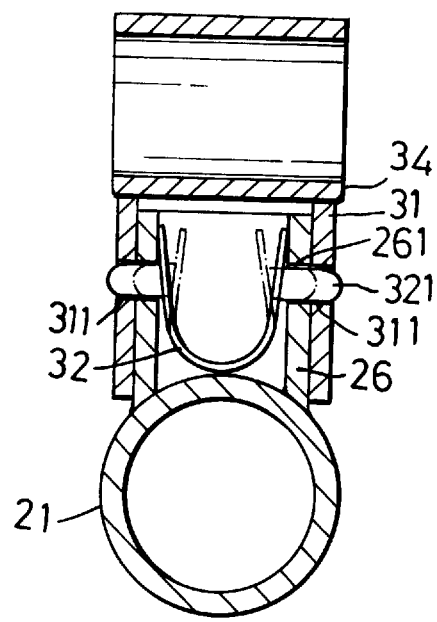
FIG. 3 is a sectional view showing a handle assembly of the preferred embodiment.

Referring to FIG. 2 in combination with FIG. 3, an upright hollow handle support 26 is mounted on the connecting member 21 near the insert plate 212 and has a top opening. Two engaging holes 261 are respectively formed in two opposing side walls of the handle support 26. A handle bar 30 has a sleeve 31 which is sleeved on the handle support 26 and which has two slots 311 to confront the engaging holes 261. Two lugs 312 project respectively from the two side walls of the sleeve 31 and have two aligned holes 313. An opening 314 is formed in the sleeve 31 between the lugs 312. A U-shaped resilient dog 32 is disposed in the handle support 26 and has two engaging ends 321 which can project into the engaging holes 261 and the slots 311. A second quick release clamp 33, which has the same construction as the first quick release clamp 24, is provided to clamp the sleeve 31 against the handle support 26.

In addition, referring again to FIG. 1, the front end 211 of the foldable connecting member 21 is connected to the front seat post 11 via a third quick clamp 212 that is the same construction as the first quick release clamp 24.

In assembly, referring again to FIGS. 2 and 3, the insert plate 212 is inserted between the clamping members 221 of the down tube 28, and is fastened to the same by the pivot member 23 and the first quick release clamp 24. The dog 32 is disposed in the handle support 26 to retain the sleeve 31 relative to the handle support 26, and the second quick release clamp 33 clamps the sleeve 31 against the handle support 26. The sleeve 31 has a portion 34 which clamps the handle bar 30.

Figure 4:
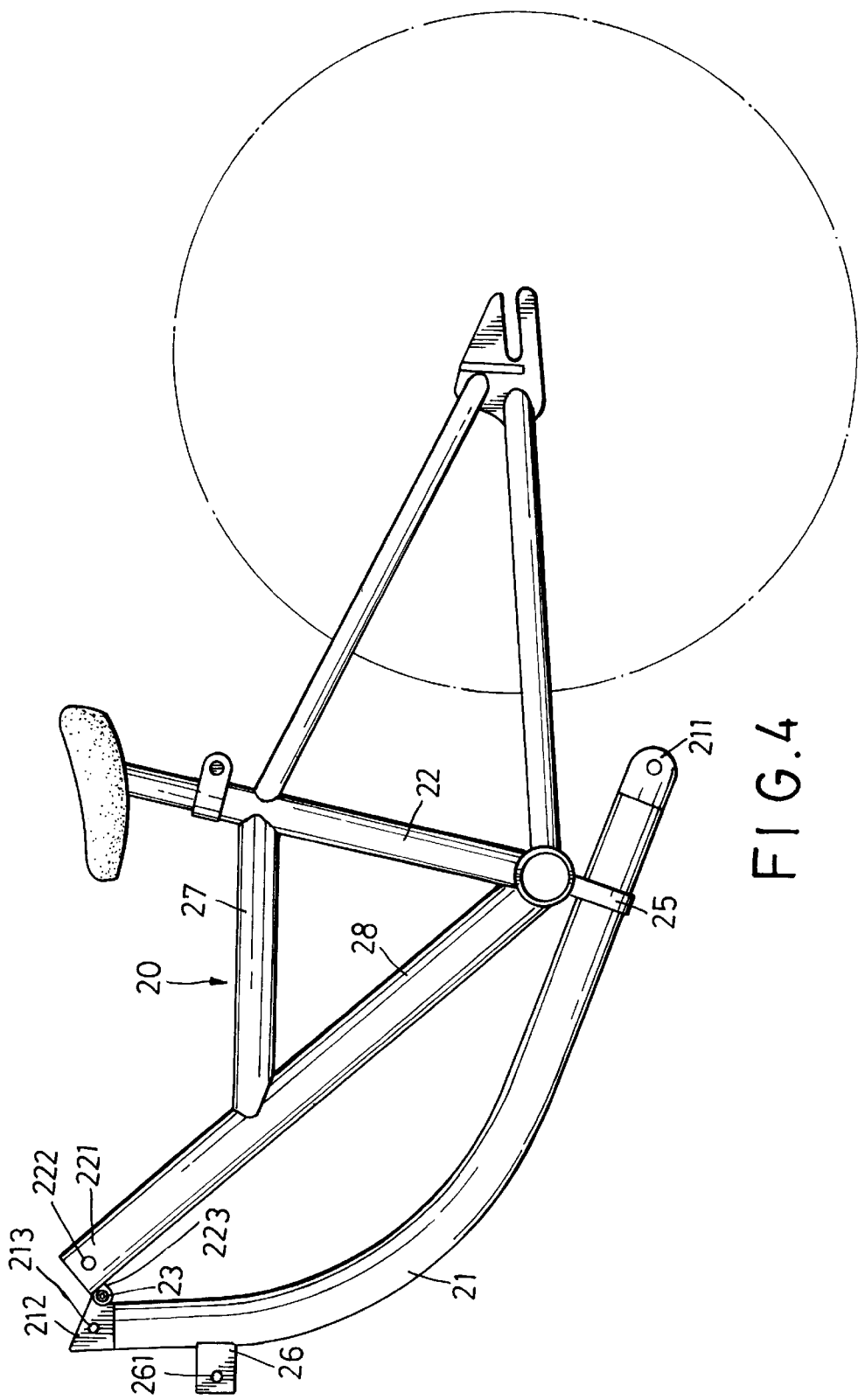
FIG. 4 is a schematic view showing the rear bicycle (frame of the preferred embodiment in a folded state.

With reference to FIG. 4, in order to fold the connecting member 21, the user may rotate outwardly the lever of the L-shaped operating member 245 and detach the nut 244 so that the insert plate 212 is separated from the clamping members 221. As such, the connecting member 21 can be rotated about the pivot member 23, and the front end 211 can be moved toward the bottom of the down tube 28 and the holding ring 25 where it can be held.

In disassembling the handle bar 30, the L-shaped operating member 335 of the second quick release clamp 33 is turned, the nut 334 is loosened and the engaging ends 321 of the resilient dog 32 are depressed so as to detach the sleeve 31 from the handle support 26. The engaging ends 321 are disengaged from the slots 311 upon depression so that the handle support 26 an be detached from the sleeve 31.

As mentioned above, the front and rear bicycle frames 10, 20 can be assembled and disassembled quickly by virtue of the quick release clamps 24, 212. The handle bar 30 can also be assembled and disassembled quickly by virtue the second quick release clamp 33. Moreover, the connecting member 21 can be folded over the down tube 28 of the rear bicycle frame 20. Due to these separable and foldable constructions, the tandem bicycle can be put in a package with a reduced size and can be easily stored or transported conveniently.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A tandem bicycle, comprising:

a front bicycle frame having a front seat tube for mounting a seat;

a rear bicycle seat frame having a rear seat tube, a top tube extending forwardly from said rear seat tube, a down tube extending upwardly and forwardly from said rear seat tube;

a connecting member interconnecting said front seat tube and said down tube, said connecting member being detachable from said front seat tube and being foldable over said down tube; and a handle assembly detachably mounted to said connecting member, wherein said handle assembly includes a hollow handle support which projects upward from said connecting member and which has two opposing walls formed with engaging holes respectively, a handle bar which has a sleeve projecting downward therefrom to be sleeved on said handle support and which has slots for alignment with said engaging holes, and a U-shaped resilient dog member which is disposed in said handle support and which has two engaging ends biased to project into said engaging holes and said slots.

2. A tandem bicycle as claimed in claim 1, wherein said sleeve is connected detachably to said handle bar.

\* \* \* \* \*